United States Patent [19]

Kume

[11] Patent Number: 4,477,127

[45] Date of Patent: Oct. 16, 1984

[54] TAPE PLAYER FOR VEHICLES

[75] Inventor: Masato Kume, Tokyo, Japan

[73] Assignee: Clarion Co., Ltd., Tokyo, Japan

[21] Appl. No.: 418,819

[22] Filed: Sep. 17, 1982

[30] Foreign Application Priority Data

Sep. 21, 1981 [JP] Japan .................................. 56-149005

[51] Int. Cl.³ .............................................. B62J 9/00
[52] U.S. Cl. ...................................... 312/8; 312/242;
312/291; 312/292; 312/293
[58] Field of Search ................... 312/7.1, 10, 291, 292,
312/242, 293, 257 SM, 351; 220/3.92, 3.94;
224/273, 279, 281, 282; 206/521, 591; 248/633,
634

[56] References Cited

U.S. PATENT DOCUMENTS 2,534,137 12/1956 Lewis ..................... 248/633
3,582,167 6/1971 Lear ........................ 312/7.1
3,947,954 4/1976 Weile ..................... 224/273
4,152,087 5/1979 Zaleski-Zamenhof et al. ..... 248/634
4,274,546 6/1981 Branson et al. ...................... 220/4 R
4,313,584 2/1982 Fukunaga ............................ 312/242

Primary Examiner—James T. McCall
Assistant Examiner—Joseph Falk
Attorney, Agent, or Firm—Russell E. Hattis

[57] ABSTRACT

A tape player for vehicles which comprises a tape player set having cushion members on its top and bottom surfaces as well as an operation board on its front face, an inner case covering the tape player set, and an outer case receiving the tape player set and the inner case, and in which the cushion members and the inner case are fixed to the outer case and the operation board, respectively, in a manner permitting disassembly of them, so that the tape player set, the inner case and the outer case are incorporated and can be easily disassembled.

9 Claims, 13 Drawing Figures

TAPE PLAYER FOR VEHICLES

BACKGROUND OF THE INVENTION

1. Field of the Invention

This invention relates to a quakeproof construction of a tape player for vehicles particularly suitable for use in two-wheeled vehicles which are subject to strong vibration.

2. Description of the Prior Art

Tape players to be mounted on automotive vehicles like two-wheeled vehicles which by nature vibrate extremely and are of open-type have to be protected from vibration and water. However, since conventional tape players for cars have been designed for use in four-wheeled vehicles which do not vibrate so much and are closed from the outer air, they don't have sufficient resistance against vibration and water. Therefore, it is apparent that life of such tape player will extremely be shortened if it is used in two-wheeled vehicles as it is.

OBJECT OF THE INVENTION

It is therefore an object of the present invention to provide a tape player for vehicles with quakeproof structure suitable for use in vehicles which vibrate so much and are of open-type.

SUMMARY OF THE INVENTION

In accordance with the present invention there is provided a tape player for vehicles which comprises:
a tape player set;
an operation board provided on the front face of said tape player set;
first cushion members provided on the top and the bottom surfaces of said tape player set, respectively;
an inner case for convering said tape player set; and
an outer case for receiving therein said tape player set and said inner case,
said first cushion members being fixed to said outer case in a manner permitting disassembly thereof and said inner case being fixed to said operation board in a manner permitting disassembly thereof.

BRIEF DESCRIPTION OF THE DRAWINGS

FIGS. 1 to 8 show a tape player with quakeproof structure according to an embodiment of the present invention in which:

FIGS. 1, 3a, 3b, 4a, 5a, 5b, 6 and 7 are perspective views, respectively;

FIG. 2a is a side elevation;

FIG. 2b is a plan; and

FIGS. 4b, 8a and 8b are sectional views.

DETAILED DESCRIPTION OF THE PREFERRED EMBODIMENT

Figure 1:
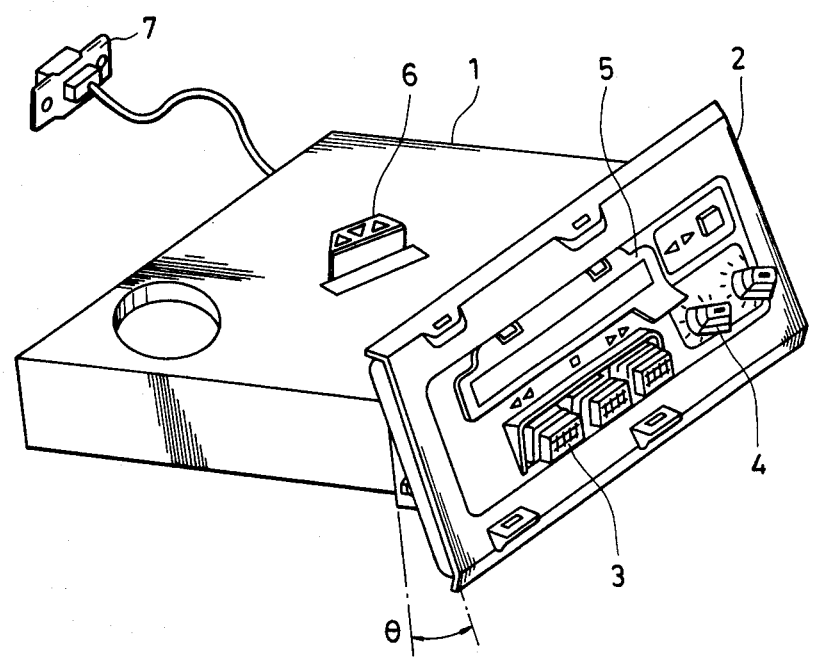

The present invention will now be described in detail by way of the preferred embodiment referring to the drawings.

Figure 2:
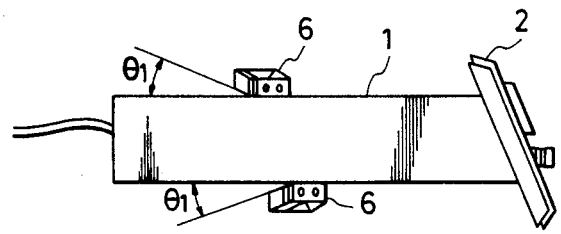
Figure 2:
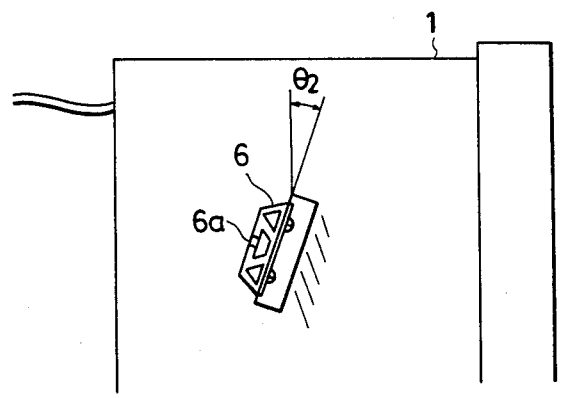

FIG. 1 is a perspective view of a tape player with quakeproof structure according to the present invention. The reference numeral 1 denotes a tape player set in which a cassette stereo set is carried by a chassis. An operation board 2 which is called "escutcheon" is mounted in front of the tape player set 1 with $\theta$ degrees inclination. The numerals 3 and 4 are operation buttons and thumb knobs, respectively. The numeral 5 refers to a cover plate for opening and closing a tape pack insertion aperture and the numeral 6 refers to cushion members to be mounted on the top and bottom surfaces of the tape player set 1. The cushion members 6 are made of an elastic material like rubber. Surfaces of the cushion members 6 which are opposed to the horizontal surfaces of the tape player set 1 are inclined $\theta_1°$ as shown in FIG. 2a. The cushion members 6 are further inclined $\theta_1°$ with respect to the width direction of the tape player set 1 as shown in FIG. 2b. As the result, the cushion members 6 are inclined in all the X, Y and Z directions of the tape player set 1. The cushion members 6 are preferably located at the centroid of the tape player set 1.

Figure 3A:
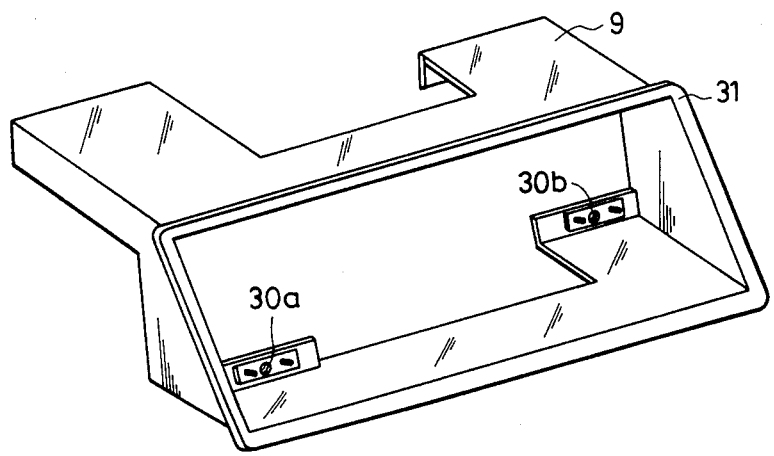
Figure 3B:
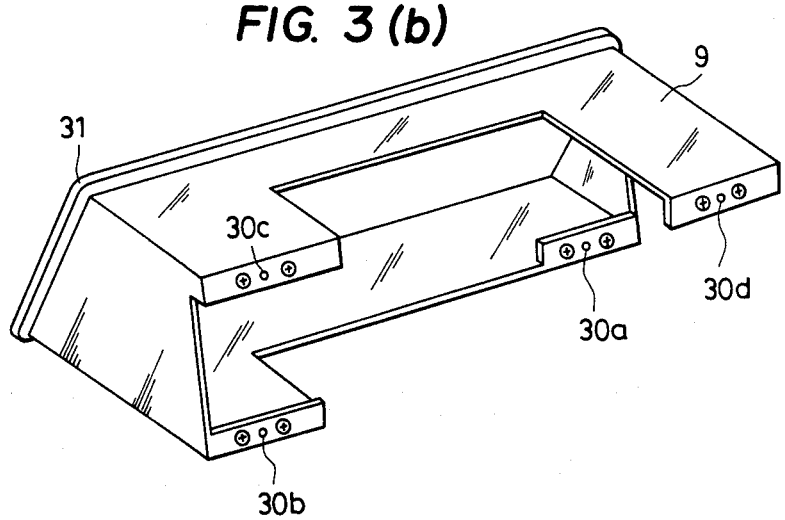

FIGS. 3a and 3b show a front-side perspective view and a rear-side perspective view, respectively, of an inner case 9 for covering the tape player set 1. The inner case 9 has bolt holes 30a to 30d formed at four corners of the rear end edge thereof and a collar 31 formed at the front end edge thereof. The collar 31 has substantially same size as the operation board 2.

Figure 4:
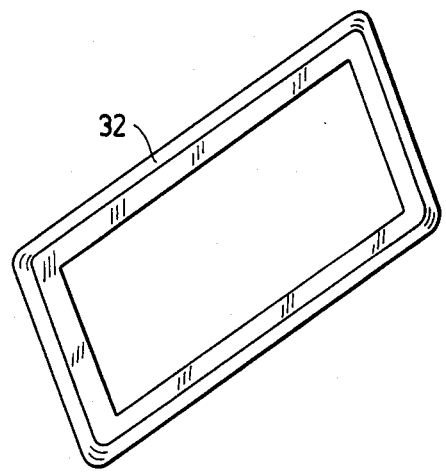
Figure 4:
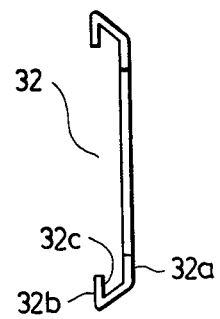

FIGS. 4a and 4b show a second cushion 32 made of an elastic material like rubber to be interposed between the operation board 2 and the collar 31 of the inner case 9.

Figure 5:
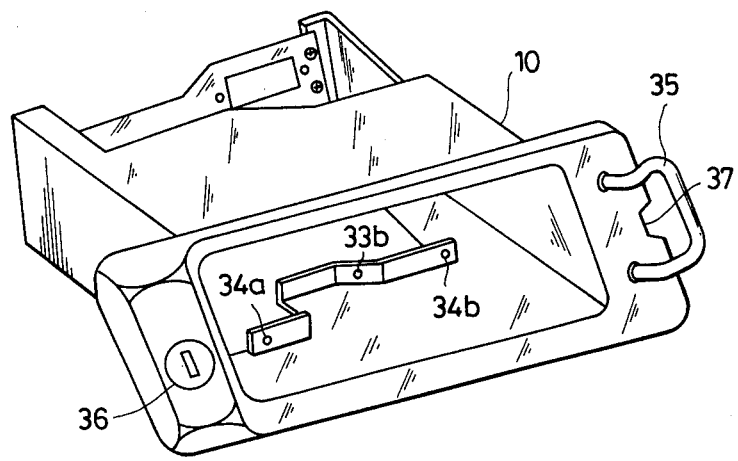
Figure 5:
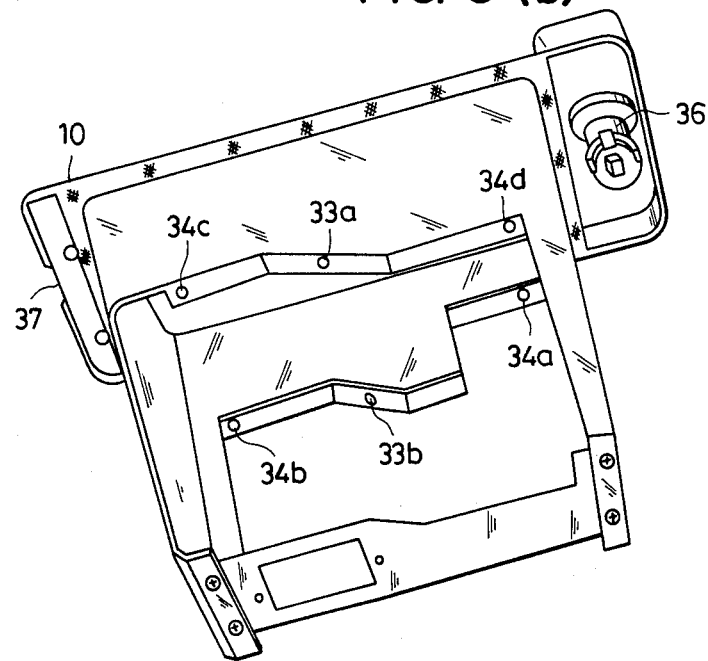

FIGS. 5a and 5b show a front-side perspective view and a rear-side perspective view, respectively, of an outer case 10. The outer case 10 has bolt holes 33a and 33b corresponding to bolt holes 6a of said cushion members 6 as well as bolt holes 34a to 34d corresponding to the bolt holes 30a to 30d of the inner case 9. The reference numeral 35 refers to a handle formed on a flange at the front end of the outer case 10, numeral 36 to a lock formed on another flange also at the front end of the outer case 10 for locking the tape player set 1 when mounting it in a fixture case, and 37 to a concavity.

Figure 6:
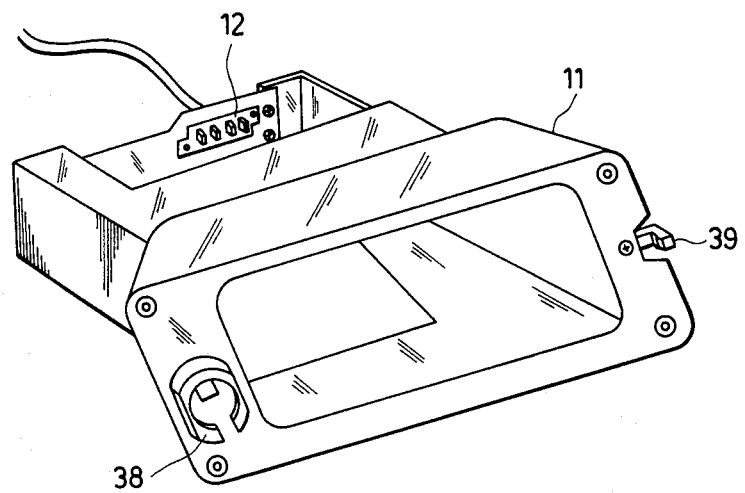

FIG. 6 shows a fixture case 11 to be mounted on two-wheeled vehicles, etc. The fixture case 11 has at the front side thereof a lock receiver 38 with which the lock 36 of the outer case 10 engages and a hook member to be inserted in said concavity 37 of the outer case 10. The fixture case 11 further has at the rear side thereof a connector 12 corresponding to a connector 7 of the tape player set 1. The connector 12 is connected to a battery, loudspeaker, headphones, etc.

Figure 7:
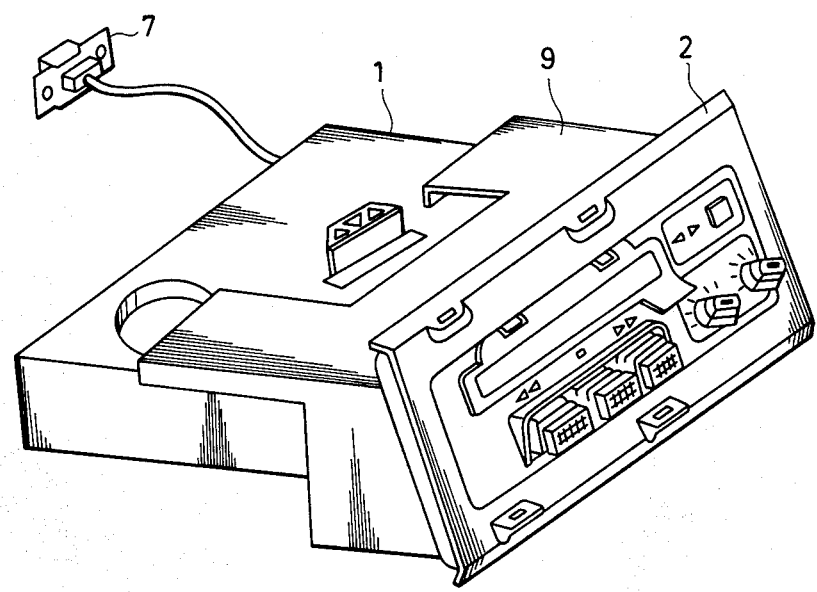

With this arrangement, the second cushion 32 as shown in FIGS. 4a and 4b is adhered to the operation board 2 of the tape player set 1 with the front surface 32a of the former and the back surface of the latter contacting with each other. This assembly may be performed by a suitable adhesive and, if necessary, by pushnuts. Next, the inner case 9 as shown in FIGS. 3a and 3b is put on the front surface 32b of the second cushion member 32. By pushing the collar 31 to pass through the cushion member 32 and fall in the groove 32c, the inner case 9 and the tape player set 1 are incorporated as shown in FIG. 7.

Said incorporated body of the inner case 9 and the tape player set 1 are inserted in the outer case 10 of FIGS. 5a and 5b from the rear side of the tape player set 1 and are secured to the outer case 10 by bolts screwed in the bolt holes 6a of the cushion member 6 and the associated bolt holes 33a and 33b of the outer case 10 as well as in the bolt holes 30a to 30d of the inner case 9 and the associated bolt holes 34a to 34a of the outer case 10, thus incorporating the tape player set 1, inner case 9 and outer case 10. In this state, the tape player set 1 is secured to the outer case 10 through the cushion member 6 and to the inner case 9 through the second cushion member 32.

Said incorporated body of the tape player set 1, inner case 9 and outer case 10 is inserted in the fixture case 11 of FIG. 6 with the hook member 39 of the fixture case 11 being engaged with the concavity 37 of the outer case 10 and with the lock 36 of the outer case 10 being inserted in the lock receiver 38 of the fixture case 11. The cassette player set 1 is thus mounted on the vehicle.

Figure 8:
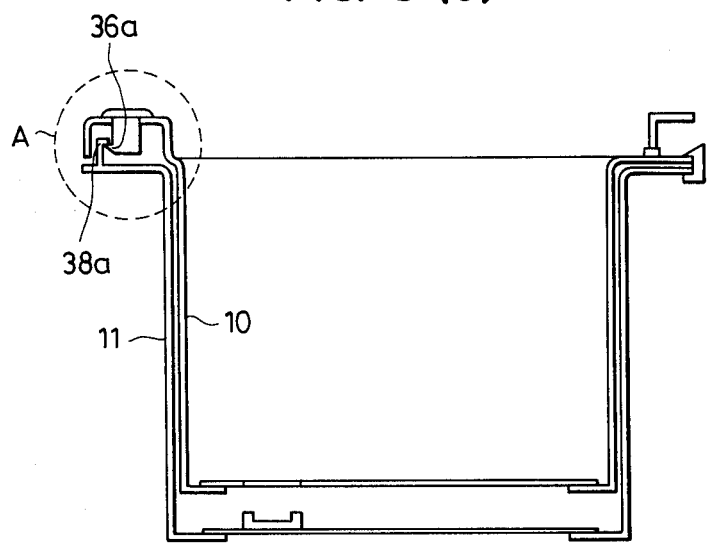
Figure 8:
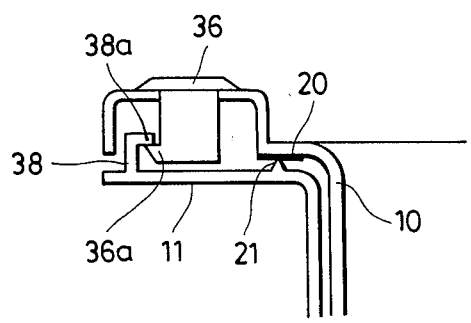

FIGS. 8a and 8b both show lock condition of the outer case 10 and the fixture case 11, and FIG. 8b is an enlargement of a part of FIG. 8a.

When the lock 36 is inserted in the lock receiver 38, a lock plate 36a and a protuberance 38a come to mesh with each other, thereby locking the outer case 10 and the fixture case 11. In this case, if an elastic member 20 made of sponge, rubber and the like is provided on the outer case 10 while a rib 21 is formed on the fixture case 11 for pressure contact with the elastic member 20, airproofness between these cases 10 and 11 can be improved.

According to said construction, the tape player set 1 is free from direct impact of vibration because the cushion members 6 and 32 maintain it somewhat floating from the cases. Because the cushion members 6 on the top and bottom surfaces of the tape player set 1 incline in three directions X, Y and Z, they are particularly effective in absorbing vibration in any directions.

In direct contact of the operation board 2 with the inner case 9 through the cushion member 32 leads to good airtightness and watertightness.

Direct fixture of the outer case 10 to the operation board 2 may be proposed. However, their complete and permanent adhesion will make it difficult to perform maintance and repair of the tape player. If they are secured to each other by rivets or screws to enable their disassembly, problem of watertight at the part of rivets or screws will rise. Such securing method is not suitable, either, because there is not sufficient space in the cases 10 and 11 for rivetting or screwing work.

Such problems mentioned in the above have been overcome by the present invention because the inner case 9 is provided and mounted to the operation board 2 in a manner permitting easy disassembly thereof and the tape player set 1 incorporated with the inner case 9 is mounted in the outer case 10 also in a manner permitting easy disassembly thereof.

Disassembly of the tape player set 1 from the fixture case 11 may be easily performed in one-touch manner only by disengaging the hook member 39 and the lock 36. The tape player set 1 is protected against theft or mischief by taking away a key of the lock 36. If the hook member 39 is made of a strong material, only one lock will meet the requirements.

As apparent from the description in the above, floating suspension of the tape player set 1 from the cases by the cushion members leads to high quakeproofness and watertightness particularly on mounting the tape player on open-type vehicles like two-wheeled vehicles which are subject to violent vibration, and to prolongment of life of the tape player.

I claim:

1. A tape player for vehicles which comprises:
a tape player set contained in a casing;
an operation board provided on the front face of said tape player set casing;
cushion members secured on the top and the bottom surfaces of said tape player set, respectively;
an inner case for covering said tape player set and its casing; and
an outer case receiving therein said tape player set and its casing and said inner case,
said cushion members being fixed directly to said outer case in a manner permitting disassembly thereof and said inner case being fixed to said tape player set in a manner permitting disassembly thereof.

2. A tape player for vehicles of claim 1 including a second cushion member interposed between said inner case and said operation board.

3. A tape player for vehicles of claim 1 or 2 in which said inner case is fixed to said outer case in a manner permitting disassembly thereof.

4. A tape player for vehicles of claim 1, which further comprises a fixture case secured to a two-wheeled vehicle, said outer case being fixed to said fixture case in a manner permitting disassembly of the former from the latter.

5. A tape player for vehicles of claim 4 in which said inner case has a lock formed on the front face thereof and said fixture case has a lock receiver for receiving said lock.

6. A tape player for vehicles of claim 5 which further includes an elastic member located near said lock of the outer case and a rib formed on said fixture case and near said lock receiver for contacting with said elastic member.

7. A tape player for vehicles which comprises:
a tape player set contained in a casing;
an operation board provided on the front face of said tape player set;
cushion members secured to the top and the bottom surfaces of said tape player set casing, respectively;
an inner case for covering said tape player set and its casing;
an outer case receiving therein said tape player set and its casing and said inner case,
said cushion members being fixed directly to said outer case in a manner permitting disassembly thereof and said inner case being fixed to said operation board in a manner permitting disassembly thereof,
a second cushion member interposed between said inner case and said operation board;
said inner case being fixed to said outer case in a manner permitting disassembly thereof; and
a fixture case secured to a vehicle and receiving therein the assembly of said tape player set and its casing contained within said inner case which is contained within said outer case, said outer case being fixed to said fixture case in a manner permitting disassembly of the former from the latter.

8. A tape player for vehicles of claim 4 or 7 in which said fixture case has a hook member for fixing said outer case to said fixture case in a manner permitting disassembly of the outer case.

9. A tape player for vehicles of claim 1 or 7 in which said cushion members have surfaces with given inclination angles with respect to X, Y and Z directions of the tape player, respectively.

* * * * *